G. A. WAGATHA.
PULVERIZER.
APPLICATION FILED DEC. 20, 1916.
1,223,840.
Patented Apr. 24, 1917.
2 SHEETS—SHEET 2.
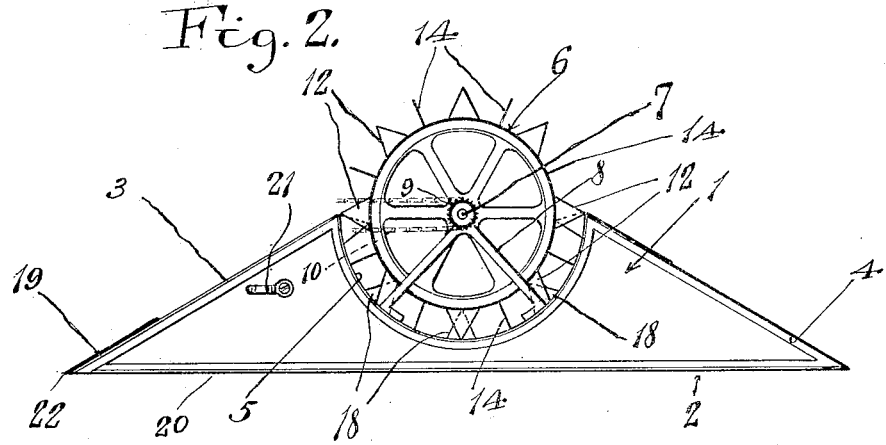
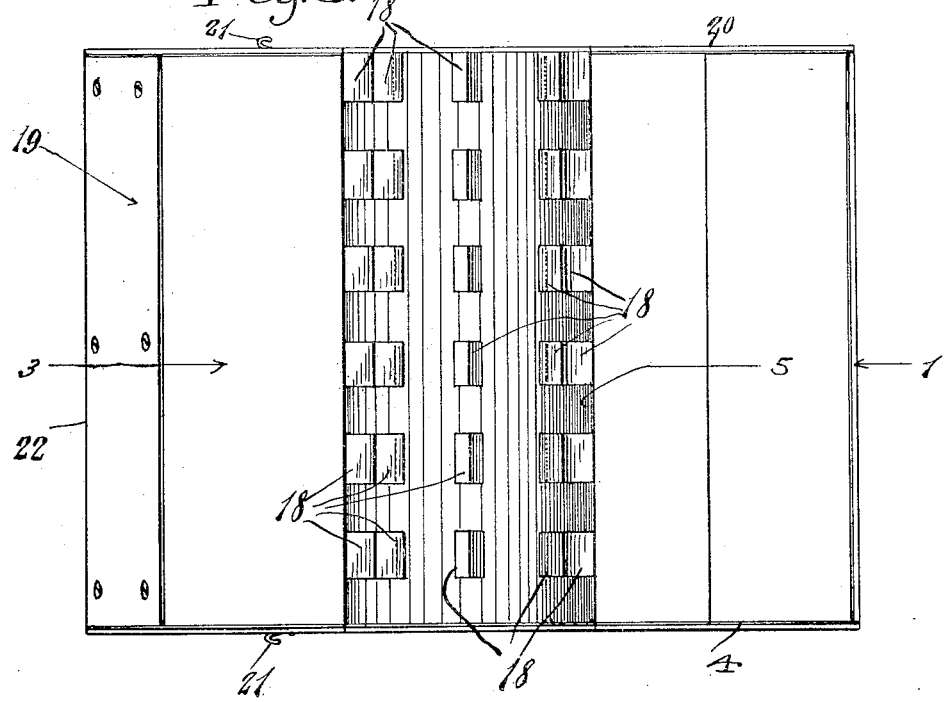
WITNESSES:
INVENTOR.
G. A. Wagatha
By
ATTORNEY.

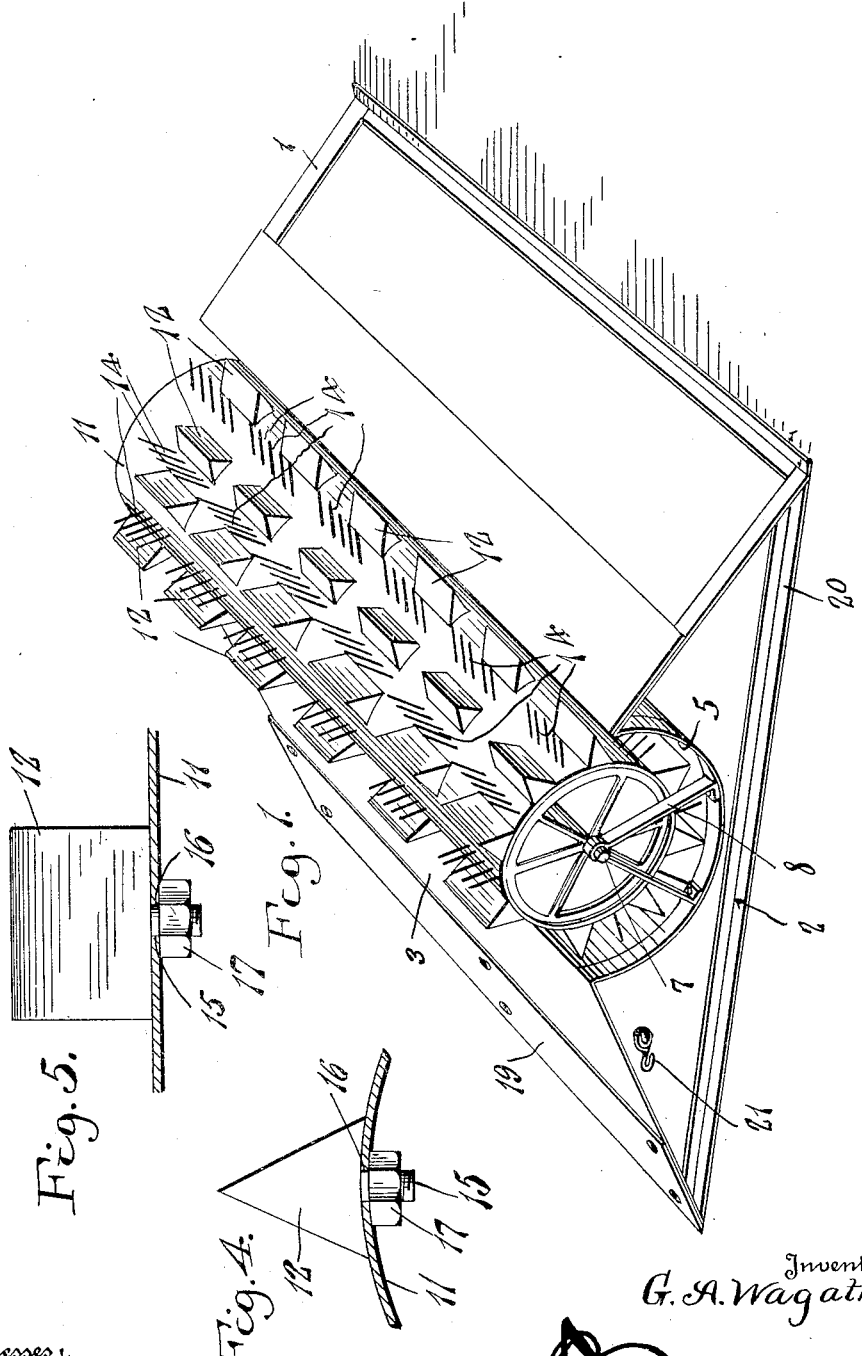

UNITED STATES PATENT OFFICE.

GEORGE A. WAGATHA, OF NEW ORLEANS, LOUISIANA.

PULVERIZER.

1,223,840.  Specification of Letters Patent.  Patented Apr. 24, 1917.

Application filed December 20, 1916. Serial No. 137,979.

*To all whom it may concern:*

Be it known that I, GEORGE A. WAGATHA, a citizen of the United States, residing at New Orleans, in the parish of Orleans and State of Louisiana, have invented certain new and useful Improvements in Pulverizers; and I do hereby declare the following to be a full, clear, and exact description of the invention, such as will enable others skilled in the art to which it appertains to make and use the same.

This invention relates to an agricultural implement which is particularly designed for destroying crab grass, rodents, beetles or the like which might be found in a field after it has been plowed preparatory to preparing it for cultivation and the primary object of the invention is to provide a pulverizer as specified which includes a main body of substantially triangular shape having its apex cutaway to form a substantially semi-cylindrical recess in which a spurred drum rotates, and to provide a plurality of removable crushers which are carried by the drum and also by the inner wall of the semi-cylindrical portion for crushing the ground and grass, animals, beetles or the like which pass therethrough.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a perspective view of the improved pulverizer.

Fig. 2 is an end view of the pulverizer.

Fig. 3 is a top plan view of the pulverizer having the drum removed.

Fig. 4 is a detail view showing one of the crushing spurs in side elevation and illustrating the manner of attaching it to the drum, Fig. 5 is an end view of one of the crushing spurs showing the manner of attaching it to the drum.

Referring more particularly to the drawings, 1 designates the body of the pulverizer, as an entirety, which body is substantially triangular in shape, having a flat bottom 2 and tapered or inclined sides 3 and 4. The body 1 of the pulverizer has the apex thereof cut away to form a semi-cylindrical recess 5 in which is mounted a drum 6. The drum 6 is mounted upon a shaft 7, which shaft is rotatably supported by suitable bearings 8 attached to the end of the body 1. The shaft 7 has a sprocket 9 mounted thereon, about which a sprocket chain 10 travels. The sprocket chain 10 may be connected to a tractor, for rotating the drum 6 by the operation of the tractor.

The drum 6 is composed of a metal shell 11, and it has a plurality of substantially pyramidal crushing spurs 12 attached thereto in rows longitudinally of the drum and circumferentially of the drum as clearly shown in Fig. 1 of the drawings. A plurality of comb teeth or tines 14 are attached to the drum 6 in rows longitudinally and circumferentially of the drum. Each set of the teeth 14 are disposed in alinement with the rows of crushing spurs circumferentially of the drum so that during the rotation of the drum, each of the crushing spurs will be followed by a cleaning comb which is formed of a plurality of the teeth or tines. The spurs 12 have shanks 15 formed thereon which extend through openings 16 formed in the metallic shell 11 and the inner ends of the shanks are screw threaded and have nuts 17 mounted thereon for securely connecting the spurs to the drum 6.

The body 1 has a plurality of crushing spurs 18 attached to the inner surface of the substantially semi-cylindrical recess 5 which spurs are disposed staggeredly with respect to the spurs 12 which are carried by the drum so that any and all material which passes into the recess 5 will be thoroughly crushed and pulverized.

A blade 19 is attached to the forward lower end of the angled or inclined side 3 of the body 1 and it is adapted for scooping up the ground, and guiding it upwardly onto the inclined side 3.

If it is so desired, the frame-work of the body 1 may be constructed of angled iron as indicated at 20, and the body composed of suitable sheet metal attached to the angled iron skeleton frame.

In the operation of the improved pulverizer; the body 1 of the pulverizer may be attached to a tractor in any suitable manner, such as through the medium of the hooks 21 which are attached to the ends thereof, so that it will be drawn rearwardly of the tractor over ground which has previously been turned or broken for cultivation. During the passage of the pulverizer over the plowed ground, the forward edge 22 will bury itself into the ground, through the medium of the blade 19 and it will force the ground upwardly over the inclined side 3 into the substantially semi-cylindrical recess 5 where the ground will be engaged by the rotary drum 6 and crushed between the crushing spurs 12 and 18, thoroughly pulverizing the ground and crushing any grass, roots, rodents, beetles or other foreign material which may be mixed with the ground, thereby thoroughly destroying animal and insect life in the ground and also destroying grass, such as crab grass, weeds or the like and materially decreasing the future work of cultivation of the land. The pulverized land or dirt will be carried upwardly by the spurs 12 and the comb structures composed of the rods 14 onto the rear inclined edge or side 4 which will resistribute the loosened and pulverized dirt over the surface of the fields.

From the foregoing description taken in connection with the accompanying drawings, the advantages of construction and of the method of operation of the improved pulverizer will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a device as set forth, a body, the front and rear sides of said body angling upwardly and toward each other, said body provided with a substantially semi-cylindrical recess formed between the upper facing edges of said front and rear inclined sides, a drum rotatably mounted within said recess, a plate attached to the forward lower edge of said forward inclined sides for loosening dirt and guiding it onto said forward inclined sides.

2. In a device as set forth, a body, the front and rear sides of said body angling upwardly and toward each other, said body provided with a substantially semi-cylindrical recess formed between the upper facing edges of said front and rear inclined sides, a drum rotatably mounted within said recess, a plate attached to the forward lower edge of said forward inclined sides for loosening dirt and guiding it onto said forward inclined sides, a plurality of crushing spurs attached to the outer surface of said drum in rows longitudinally and circumferentially of the drum, and crushing spurs arranged in rows longitudinally and circumferentially of the inner surface of said substantially semi-cylindrical recess, the spurs carried by the walls of said recess being disposed staggeredly with respect to the drum carried spurs.

3. In a device as set forth, a body, the front and rear sides of said body angling upwardly and toward each other, said body provided with a substantially semi-cylindrical recess formed between the upper facing edges of said front and rear inclined sides, a drum rotatably mounted within said recess, a plate attached to the forward lower edge of said forward inclined sides for loosening dirt and guiding it onto said forward inclined sides, a plurality of crushing spurs attached to the outer surface of said drum in rows longitudinally and circumferentially of the drum, and crushing spurs arranged in rows longitudinally and circumferentially of the inner surface of said substantially semi-cylindrical recess, the spurs carried by the walls of said recess being disposed staggeredly with respect to the drum carried spurs, and a plurality of tines carried by said drum and arranged in sets, said sets of tines being disposed in alinement with the circumferential rows of said drum carried spurs and intermediate of the rows.

4. In a device as set forth, a body, said body provided with a substantially semi-cylindrical recess, means for guiding dirt upwardly into said recess, a drum rotatably mounted within the recess, a plurality of crushing spurs carried by the periphery of said drum and arranged in rows longitudinally and circumferentially of the drum, and a plurality of crushing spurs projecting into said recess and disposed staggeredly with respect to the drum carried spurs.

5. In a device as set forth, a body, said body provided with a substantially semi-cylindrical recess, means for guiding dirt upwardly into said recess, a drum rotatably mounted within the recess, a plurality of crushing spurs carried by the periphery of said drum and arranged in rows longitudinally and circumferentially of the drum, and a plurality of crushing spurs projecting into said recess and disposed staggeredly with respect to the drum carried spurs, and a plurality of tines carried by said drum and disposed in sets alining with the circumferential rows of said drum carried crushing spurs.

In testimony whereof I affix my signature in presence of two witnesses.

GEORGE A. WAGATHA.

Witnesses:
GUS A. LLAMBIAS,
R. F. DELERY.

Copies of this patent may be obtained for five cents each, by addressing the "Commissioner of Patents, Washington, D. C."